(12) United States Patent
Sauvageon et al.

(10) Patent No.: US 6,459,839 B1
(45) Date of Patent: Oct. 1, 2002

(54) PHASE-SHIFTED MONOMODE OPTICAL FIBRE WITH LARGE EFFECTIVE AREA

(75) Inventors: Raphaelle Sauvageon, Thones; Jean-Claude Rousseau, Chatou; Jean-François Chariot, Marly le Roi; Pascale Nouchi, Maisons Laffitte; Louis-Anne de Montmorillon, Paris, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/647,744

(22) PCT Filed: Oct. 4, 1999

(86) PCT No.: PCT/FR99/02352
§ 371 (c)(1),
(2), (4) Date: Dec. 13, 2000

(87) PCT Pub. No.: WO00/20905
PCT Pub. Date: Apr. 13, 2000

(30) Foreign Application Priority Data

Oct. 5, 1998 (FR) .............................. 98 12431

(51) Int. Cl.[7] ................................. G02B 6/16
(52) U.S. Cl. .................. 385/123; 385/126; 385/127
(58) Field of Search ................... 385/123, 124, 385/125, 126, 127, 142

(56) References Cited

U.S. PATENT DOCUMENTS 4,715,679 A * 12/1987 Bhagavatula ............... 385/127

FOREIGN PATENT DOCUMENTS

| EP | 0 721 119 A1 | 7/1996 |
| EP | 0 789 255 A1 | 8/1997 |
| EP | 0 859 247 A2 | 8/1998 |
| WO | WO 97/33188 | 9/1997 |
| WO | WO 00/14580 | 3/2000 |

OTHER PUBLICATIONS

Y. Liu et al, "Design and fabrication of locally dispersion–flattened large effective area fibers", European Conference on Optical Communication, ECOC '98, vol. 1, Sep. 20–24, 1998, pp. 37–38 XP002106023.

Y. Liu et al, "Single–mode dispersion–shifted fibers with effective area over 100um2", European Conference on Optical Communication, ECOC '98, vol. 1, Sep. 20–24, 1998, pp. 41–42, XP002106024.

Masao Kato et al, "A new design for dispersion–shifted fiber with an effective core area larger than 100um2 and good bending characteristics", OFC'98 Technical Digest, Feb. 22–27, 1998, pp. 301–302, XP002104987.

P. Nouchi et al, "New dispersion shifted fiber with effective area larger than 90 mu m/sup 2/", Proceedings of the European Conference on Optical Communication, vol. 1, Jan. 1, 1996, pp. 49–52 XP002092143.

* cited by examiner

*Primary Examiner*—Phan T. H. Palmer
(74) *Attorney, Agent, or Firm*—Sughrue Mion, PLLC

(57) ABSTRACT

A monomode dispersion shifted optical fibre having an effective core area greater than 100 $\mu m^2$, characterized in that it has a chromatic dispersion cancellation wavelength $\lambda_0$ from 1 400 nm to 1 500 nm and low curvature losses.

17 Claims, 1 Drawing Sheet

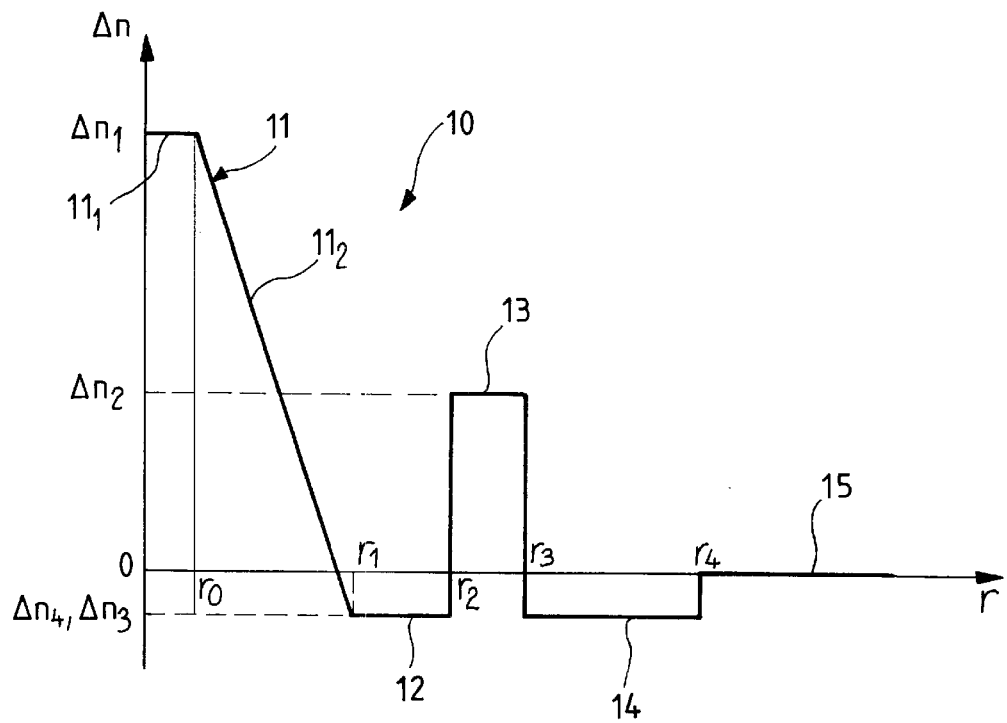
FIG_1
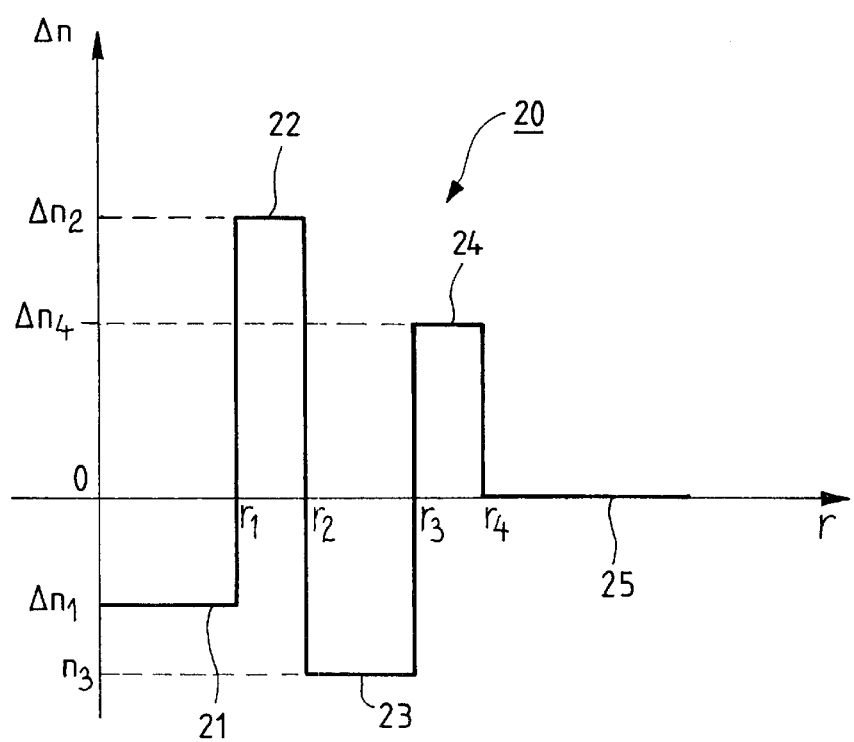
FIG_2

PHASE-SHIFTED MONOMODE OPTICAL FIBRE WITH LARGE EFFECTIVE AREA

BACKGROUND OF THE INVENTION

The present invention relates to optical fibres and in particular to dispersion shifted fibres intended to be used in wavelength division multiplex transmission systems.

Monomode optical fibres referred to as dispersion shifted fibres (DSF) are used at wavelengths around 1 550 nm, and more generally in a window of wavelengths from 1 500 nm to 1 600 nm. Silica has non-zero chromatic dispersion at these wavelengths (in contrast to its chromatic dispersion in the transmission wavelength window around 1 300nm). The chromatic dispersion of the silica is compensated, in particular by increasing the index difference Δn between the core of the fibre and its optical cladding, to limit chromatic dispersion of the wave transmitted in the transmission window of dispersion shifted fibres. In practice this index difference shifts the wavelength at which chromatic dispersion is cancelled out; it is obtained by introducing dopants into the fibre during its fabrication, for example by an MCVD process known in the art, which is not described in more detail here. A typical value for the index difference between the cladding and the core of the fibre is $10 \times 10^{-3}$ to $14 \times 10^{-3}$; the index can be increased in the silica by using germanium as the dopant.

Monomode dispersion shifted fibres must also have low curvature losses and low attenuation, just like conventional line fibres.

What is more, using dispersion shifted fibres in wavelength division multiplex transmission systems which transmit RZ, NRZ or soliton pulses is subject to further constraints, all the more so as the number of channels transmitted, the bit rate of each channel and the power on the output side of the amplifier increase and the spacing between channels decreases. Thus it is preferable to use a fibre having sufficiently high chromatic dispersion in the transmission window to prevent the phenomenon of four-wave mixing. Fibres are therefore used which have a chromatic dispersion cancellation wavelength $\lambda_0$ other than 1 550 nm to prevent the problems caused by four-wave mixing. These fibres are referred to as non-zero dispersion shifted fibres (NZ-DSF).

Finally, to avoid non-linear effects, the fibres must have a large effective core area, typically greater than 70 $\mu m^2$.

M. Kato et al., "A new design for dispersion shifted fibre with an effective core area larger than 100 $\mu m^2$ and good bending characteristics", ThK1, OFC'98 Technical Digest, explains that non-linear effects in the fibres could become the dominant limitation on transmission capacity and distance for long-haul high-capacity amplified transmission systems. The document specifies that one possible solution is to increase the effective core area of the fibres, which produces a higher power and a greater distance between repeaters. The document proposes a fibre having a profile referred to as a coaxial profile, surrounded by a pedestal, with an effective core area of 146 $\mu m^2$ and a chromatic dispersion cancellation wavelength $\lambda_0$ of 1 500 nm. The chromatic dispersion at 1 550 nm is low and the dispersion slope at this wavelength is 0.09 ps/nm$^2$.km.

EP-A-0 789 255 describes dispersion shifted fibres with high effective core areas, greater than 200 $\mu m^2$. The fibres have wavelengths $\lambda_0$, greater than 1 550 nm. One example of a family of fibres has a value of $\lambda_0$ at 1 580 nm, an effective core area of 265 $\mu m^2$ and a chromatic dispersion slope of 0.085 ps/nm$^2$.km.

The fibres described in the above two prior art documents have the disadvantage of very low chromatic dispersion at 1 550 nm; this value of the chromatic dispersion at 1 550 nm does not prevent four-wave mixing.

SUMMARY OF THE INVENTION

The object of the invention is to provide a dispersion shifted fibre with a high effective core area which also has sufficiently high chromatic dispersion at 1 550 nm to prevent four-wave mixing.

To this end the invention proposes a monomode dispersion shifted optical fibre having an effective core area greater than 100 $\mu m^2$, characterized in that it has a chromatic dispersion cancellation wavelength $\lambda_0$ from 1 400 nm to 1 500 nm and low curvature losses.

In one embodiment of the invention, the chromatic dispersion cancellation wavelength $\lambda_0$ is from 1 450 nm to 1 500 nm and preferably approximately 1 480 nm.

The fibre advantageously has a chromatic dispersion from 7.5 ps/nm.km to 10 ps/nm.km for a wavelength of 1 550 nm.

In one embodiment of the invention, the fibre has an effective core area from 110 $\mu m^2$ to 125 $\mu m^2$.

In another embodiment of the invention, 100 turns of fibre with a radius of 30 mm have an attenuation less than or equal to 0.1 dB at a wavelength of 1 670 nm.

A first embodiment of a fibre according to the invention has an index profile with a core surrounded by an optical cladding, said core including, coaxially and starting from the axis of the fibre:

a trapezium-shaped central part, an intermediate area in which the index is lower than the maximum index of the central part, and a ring in which the index is lower than the maximum index of the central part and higher than that of the intermediate area.

The profile advantageously includes between the ring and the cladding a second intermediate area in which the index is lower than that of the cladding.

In a second embodiment of the invention, the fibre has an index profile with a core surrounded by an optical cladding, said core including, coaxially and starting from the axis of the fibre:

a central part in which the index is lower than or substantially equal to that of the cladding, a peripheral area in which the index is higher than that of the central part, an intermediate area in which the index is lower than that of the central part, and a ring in which the index is higher than that of the cladding.

BRIEF DESCRIPTION OF THE DRAWINGS

Other features and advantages of the invention will become apparent on reading the following description of embodiments of the invention, which description is given by way of example and with reference to the accompanying drawings, in which:

FIG. 1 is a diagrammatic representation of the index profile of a first embodiment of a fibre according to the invention, and FIG. 2 is a diagrammatic representation of the index profile of a second embodiment of a fibre according to the invention.

DETAILED DESCRIPTION OF THE INVENTION

The fibre according to the invention has a large effective core area, typically greater than 100 $\mu m^2$, and a chromatic dispersion cancellation wavelength $\lambda_0$ from 1 400 nm to 1 500 nm. A value of $\lambda_0$ from 1 450 nm to 1 500 nm, for example around 1 480 nm, as in the example shown in the figure, proves to be appropriate for wavelength division multiplex transmission. Effective core areas from 110 $\mu m^2$ to 125 $\mu m^2$ are suitable.

The invention further proposes that the chromatic dispersion at 1 550 nm be from 7.5 ps/nm.km to 10 ps/nm.km. Those values limit four-wave mixing in the current transmission wavelength ranges and in particular from 1 530 nm to 35 1 580 nm for wavelength division multiplex transmission systems.

The invention finally proposes a fibre whose sensitivity to curvatures is similar to that of prior art fibres, or even better. Values of $\lambda_S$ beyond 1 600 nm, and for example of the order of 1 670 nm, are appropriate. The wavelength $\lambda_S$ is the wavelength at which the attenuation caused by winding 100 turns of fibre with a radius of 30 mm reaches 0.1 dB. The invention therefore provides a fibre having an attenuation increment of less than 0.05 dB at 1 550 nm for 100 turns of fibre with a radius of 30 mm.

FIG. 1 is a diagrammatic representation of an index profile 10 that can produce the features of the invention. The radii in $\mu m$ are plotted on the abscissa axis and the index, defined by its difference relative to the index of the cladding of the fibre, either as a relative value ($\Delta n$) or as a percentage ($\Delta n\% = 100 \cdot \Delta n/n$), is plotted on the ordinate axis.

The index profile shown in FIG. 1 is a trapezium+ring index profile. It includes, starting from the centre of the fibre and in the direction of the cladding, a central part $11_1$ having a substantially constant index, or to be more precise a substantially constant index difference $\Delta n$, extending out to a radius $r_0$. The index $\Delta n_1$ is higher than the index $n_c$ of the silica of the cladding 15. In the embodiment shown in the figure, the index $\Delta n_1$ is from 0.75% to 0.85% and the radius $r_0$ is 0.84 $\mu m$.

Around this central part $11_1$ in which the index is higher than that of the cladding 15, the fibre of the invention has a part $11_2$ whose index decreases linearly or substantially linearly between the radii $r_0$ and $r_1$; this linearly decreasing index part $11_2$ and the central part $11_1'$ together constitute a trapezium 11. The index $r_1$ can take values from 2.75 $\mu m$ to 2.85 $\mu m$; the constant index part of the trapezium 11, i.e. the top of the trapezium, extends approximately 0.3 times the total radius of the trapezium, representing a ratio $r_0/r_1$ from 0.2 to 0.5, for example.

The fibre then has a first intermediate area 12 between radii $r_1$ and $r_2$ in which the index $\Delta n_3$ is substantially constant and lower than or equal to the index of the cladding 15. In the embodiment shown in the figure, the index difference $\Delta n_3$ is −0.02% and the radius $r_2$ can take values from 4.8 $\mu m$ to 5.1 $\mu m$. More generally, values of $\Delta n_3$ between −0.01% and −0.03% are appropriate.

The fibre has around the first intermediate area 12 a ring 13 in which the index $\Delta n_2$ is higher than that of the cladding 15. In the FIG. 1 embodiment, the ring 13 has an index $\Delta n_2$ from 0.45% to 0.52% between radii $r_2$ and $r_3$. The index $\Delta n_2$ of the ring is preferably less than or equal to the index $\Delta n_1$ of the central part $11_1$ of the trapezium. The outside radius $r_3$ of the ring 13 is preferably from 6.1 $\mu m$ to 6.6 $\mu m$.

Outside the ring 13, before the cladding 15, the fibre has a second intermediate area 14 in which the index is lower than or equal to that of the cladding 15. In the FIG. 1 example, the second intermediate area 14 has the same index $\Delta n_4$ of −0.02% (or preferably from −0.03% to −0.01%) as the first intermediate area 12 between the trapezium 11 and the ring 13. The second intermediate area 14 lies between the radii $r_3$ and $r_4$ where the value of $r_4$ is from 12.4 $\mu m$ to 13.1 $\mu m$.

The chosen index profile gives the fibre a high effective core area, from 110 $\mu m^2$ to 125 $\mu m^2$, and a chromatic dispersion cancellation wavelength $\lambda_0$ from 1 450 nm to 1 480 nm. It is therefore possible to increase the power of the amplifiers in a wavelength division multiplex transmission system and to reduce the distance between repeaters of a transmission system using the optical fibre of the invention as the transmission medium.

In the foregoing example, the chromatic dispersion at 1 550 nm is 8.8 ps/nm.km and is thus between the preferred values from 7.5 ps/nm.km to 10.0 ps/nm.km.

The attenuation in the fibre is advantageously low enough to provide good in-cable performance; to this end it is advantageous for the wavelength $\lambda_S$ of the fibre to be greater than or equal to 1 670 nm or, which amounts to the same thing, for the attenuation due to curvatures to be less than 0.1 dB below that wavelength.

Another example of a trapezium+ring profile like that shown in FIG. 1 has the parameters set out in table 1 below.

TABLE 1

| $r_0$ ($\mu m$) | $r_1$ ($\mu m$) | $r_2$ ($\mu m$) | $r_3$ ($\mu m$) | $10^3 \times \Delta n_1$ | $10^3 \times \Delta n_2$ | $10^3 \times \Delta n_3$ | $10^3 \times \Delta n_4$ |
|---|---|---|---|---|---|---|---|
| 0.68 | 2.27 | 4.61 | 5.98 | 13.7 | 8.5 | 0 | 0 |

The propagation characteristics of a fibre having the table 1 parameters are set out in table 2 below, in which the following notation is used:

$\lambda_C$: theoretical cut-off wavelength, $\lambda_0$: chromatic dispersion cancellation wavelength, CD/d$\lambda$: chromatic dispersion slope at 1 550 nm, CD: chromatic dispersion at 1 550 nm, $W_{02}$: mode diameter at 1 550 nm, $S_{eff}$: effective core area at 1 550 nm, $S_C$: sensitivity to curvatures at 1 550 nm for 100 turns with a radius of 30 mm, and $S_{\mu c}$: sensitivity to microcurvatures at 1 550 nm as a proportion relative to the G652 fibre sold by the applicant.

TABLE 2

| $\lambda_c$ (nm) | $\lambda_0$ (nm) | CD/dλ (ps/nm² · km) | CD (ps/nm² · km) | $2W_{02}$ (μm) | $S_{eff}$ (μm²) | $S_c$ (dB) | $S_{\mu c}$ |
|---|---|---|---|---|---|---|---|
| 1 780 | 1 475 | 0.1 | 8 | 10.6 | 109 | <10⁻³ | 1.2 |

The theoretical cut-off wavelength is generally two to four hundred nanometres greater than the cut-off wavelength as measured in the fibre when incorporated into the cable containing it. Accordingly, the in-cable cut-off wavelength of the fibre according to the invention is less than 1 500 nm and the fibre according to the invention is effectively a monomode fibre throughout the range of wavelengths of the multiplex.

which the index $\Delta n_3$ is lower than or equal to that of the cladding 25. Finally, between the intermediate area 23 and the cladding 25, the fibre includes a ring 24 between radii $r_3$ and $r_4$ in which the index is $\Delta n_4$. The parameters characteristic of two examples of fibres according to the invention corresponding to the FIG. 2 profile are set out in table 3 and the respective propagation characteristics of the fibres are set out in the corresponding rows of table 4.

TABLE 3

| $r_1$ (μm) | $r_2$ (μm) | $r_3$ (μm) | $r_4$ (μm) | $10^3 \times \Delta n_1$ | $10^3 \times \Delta n_2$ | $10^3 \times \Delta n_3$ | $10^3 \times \Delta n_4$ |
|---|---|---|---|---|---|---|---|
| 3.99 | 5.71 | 13.86 | 16.3 | 0 | 11.35 | −34 | 2.25 |
| 2.13 | 3.55 | 5.68 | 7.1 | 0 | 11.7 | −2.35 | 5.85 |

TABLE 4

| $\lambda_c$ (nm) | $\lambda_0$ (nm) | CD/dλ (ps/nm² · km) | CD (ps/nm² · km) | $2W_{02}$ (μm) | $S_{eff}$ (μm²) | $S_c$ (dB) | $S_{\mu c}$ |
|---|---|---|---|---|---|---|---|
| 1 710 | 1 460 | 0.084 | 8 | 8.7 | 137 | <10⁻⁵ | 1.3 |
| 1 705 | 1 455 | 0.081 | 8 | 10 | 102 | <10⁻⁵ | 1 |

More generally, the parameters of fibres according to the invention which have a trapezium+ring profile can be chosen as follows to satisfy the requirements of the invention:

$$9 \times 10^{-3} \leq \Delta n_1 \leq 17 \times 10^{-3}$$

$$3 \times 10^{-3} \leq \Delta n_2 \leq 10.5 \times 10^{-3}$$

$$-0.5 \times 10^{-3} \leq \Delta n_3 \leq 0.5 \times 10^{-3}$$

Choosing index differences from the above ranges yields the following ranges for the radii:

$$0.35 \leq r_1/r_3 \leq 0.5$$

$$0.55 \leq r_2/r_3 \leq 0.85$$

$$5 \, \mu m \leq r_3 \leq 7.5 \, \mu m$$

FIG. 2 is a diagrammatic representation of an index profile 20 that can produce the features of the invention. The radii in μm are plotted on the abscissa axis and the index as an absolute difference Δn relative to the index of the optical cladding is plotted on the ordinate axis.

The FIG. 2 index profile is a coaxial index profile. The profile 20 includes, starting from the centre of the fibre and in the direction of the cladding, a central part 21 having a substantially constant index, or to be more precise a substantially constant index difference $\Delta n_1$, extending out to a radius $r_1$. The index $\Delta n_1$ is lower than or substantially equal to the index $n_C$ of the silica of the cladding 25. The fibre then has a peripheral area 22 between radii $r_1$ and $r_2$ in which the index $\Delta n_2$ is substantially constant and higher than or equal to the index of the cladding 25. Around the peripheral area 22 is an intermediate area 23 between radii $r_2$ and $r_3$ in More generally, the parameters of fibres according to the invention having a coaxial+ring profile can be chosen as follows to satisfy the requirements of the invention:

$$-7 \times 10^{-3} \leq \Delta n_1 \leq 0.5 \times 10^{-3}$$

$$10 \times 10^{-3} \leq \Delta n_2 \leq 17 \times 10^{-3}$$

$$-7 \times 10^{-3} \leq \Delta n_3 \leq -2 \times 10^{-3}$$

$$1 \times 10^{-3} \leq \Delta n_4 \leq 6 \times 10^{-3}$$

Choosing index differences in the above ranges yields the following ranges for the radii:

$$0.4 \leq r_1/r_2 \leq 0.7$$

$$0.3 \leq r_2/r_4 \leq 0.6$$

$$0.6 \leq r_3/r_4 \leq 0.9$$

$$6 \, \mu m \leq r_4 \leq 17 \, \mu m$$

Fibres with profiles of the FIG. 2 type have the same advantages as those with profiles of the FIG. 1 type.

The skilled person can put the invention into practice using processes known in the art, such as the MCVD process or other processes routinely used to fabricate optical fibres.

Of course, the present invention is not limited to the examples and embodiments described and shown, and is open to many variants that will suggest themselves to the skilled person. Thus the invention has been described in its preferred application to compensating dispersion in wavelength division multiplex transmission systems. It has other applications.

The FIGS. 1 and 2 profiles constitute examples enabling implementation of the invention. Other profiles can produce the slope and dispersion values proposed in accordance with the invention.

What is claimed is:

1. A monomode dispersion shifted optical fibre having an effective core area greater than 100 $\mu m^2$, characterized in that said fiber has a chromatic dispersion cancellation wavelength $\lambda_0$ from 1400 nm to 1500 nm and low curvature losses.

2. A fibre according to claim 1, characterized in that it has an index profile with a core surrounded by an optical cladding, said core including, coaxially and starting from the axis of the fibre:

a trapezium-shaped central part, an intermediate area in which the index is lower than the maximum, index of the central part, and a ring in which the index is lower than the maximum index of the central part and higher than that of the intermediate area.

3. A fibre according to claim 2, characterized in that the profile includes between the ring and the cladding a second intermediate area in which the index is lower than or equal to that of the cladding.

4. A fibre according to claim 2, characterized in that:

the index difference between said central part and said cladding is from $9 \times 10^{-3}$ to $17 \times 10^{-3}$, the index difference between said ring and said cladding is from $3 \times 10^{-3}$ to $10.5 \times 10^{-3}$, and the index difference between said intermediate area and said cladding is from $-0.5 \times 10^{-3}$ to $0.5 \times 10^{-3}$.

5. A fibre according to claim 1, characterized in that it has an index profile with a core surrounded by an optical cladding, said core including, coaxially and starting from the axis of the fibre:

a central part in which the index is lower than or equal to that of the cladding, a peripheral area in which the index is higher than that of the central part, an intermediate area in which the index is lower than that of the central part, and a ring in which the index is higher than that of the cladding.

6. A fibre according to claim 5, characterized in that:

the index difference between the central part and the cladding is from $-7 \times 10^{-3}$ to $0.5 \times 10^{-3}$, the index difference between said peripheral area and the cladding is from $10 \times 10^{-3}$ to $17 \times 10^{-3}$, the index difference between said intermediate area and the cladding is from $-7 \times 10^{-3}$ to $-2 \times 10^{-3}$, and the index difference between said ring and the cladding is from $1 \times 10^{-3}$ to $6 \times 10^{-3}$.

7. A fibre according to claim 1, characterized in that the chromatic dispersion cancellation wavelength $\lambda_0$ is from 1450 nm to less than 1500 nm.

8. A fibre according to claim 1, characterized in that it has a chromatic dispersion from 7.5 ps/nm.km to 10 ps/nm.km for a wavelength of 1 550 nm.

9. A fibre according to claim 1, characterized in that it has an effective core area from 110 $\mu m^2$ to 125 $\mu m^2$.

10. A fibre according to claim 1, characterized in that 100 turns of fibre with a radius of 30 mm have an attenuation less than or equal to 0.1 dB at a wavelength of 1 670 nm.

11. The fibre according to claim 1, wherein the chromatic dispersion cancellation wavelength $\lambda_0$ is approximately 1480 nm.

12. The fibre according to claim 1, wherein the chromatic dispersion cancellation wavelength $\lambda_0$ is approximately from 1450 nm to 1480 nm.

13. A monomode dispersion shifted optical fibre having an effective core area greater than 100 $\mu m^2$, characterized in that said fibre has a chromatic dispersion cancellation wavelength $\lambda_0$ from 1400 nm to 1500 nm and low curvature losses; and wherein said fibre has an index profile with a core surrounded by an optical cladding, said core including, coaxially and starting from the axis of the fibre:

a trapezium-shaped central part, an intermediate area in which the index is lower than a maximum index of the central part, and a ring in which the index is lower than the maximum index of the central part and higher than that of the intermediate area.

14. The fibre according to claim 13, characterized in that the profile includes between the ring and the cladding a second intermediate area in which the index is lower than or equal to that of the cladding.

15. The fibre according to claim 13, characterized in that:

the index difference between said central part and said cladding is from $9 \times 10^{-3}$ to $17 \times 10^{-3}$, the index difference between said ring and said cladding is from $3 \times 10^{-3}$ to $10.5 \times 10^{-3}$, and the index difference between said intermediate area and said cladding is from $-0.5 \times 10^{-3}$ to $0.5 \times 10^{-3}$.

16. A monomode dispersion shifted optical fibre having an effective core area greater than 100 $\mu m^2$, characterized in that said fibre has a chromatic dispersion cancellation wavelength $\lambda_0$ from 1400 nm to 1500 nm and low curvature losses; and wherein said fibre has an index profile with a core surrounded by an optical cladding, said core including, coaxially and starting from the axis of the fibre:

a central part in which the index is lower than or equal to that of the cladding, a peripheral area in which the index is higher than that of the central part, an intermediate area in which the index is lower than that of the central part, and a ring in which the index is higher than that of the cladding.

17. The fibre according to claim 16, characterized in that:

the index difference between the central part and the cladding is from $-7 \times 10^{-3}$ to $0.5 \times 10^{-3}$, the index difference between the peripheral area and the cladding is from $10 \times 10^{-3}$ to $17 \times 10^{-3}$, the index difference between the intermediate area and the cladding is from $-7 \times 10^{-3}$ to $-2 \times 10^{-3}$, and the index difference between the ring and the cladding is from $1 \times 10^{-3}$ to $6 \times 10^{-3}$.

* * * * *